Jan. 9, 1968   P. METZ ET AL   3,362,700
TRANSPORTING AND LIFTING CAR FOR REFINING VESSELS
Filed Sept. 23, 1964   5 Sheets-Sheet 2
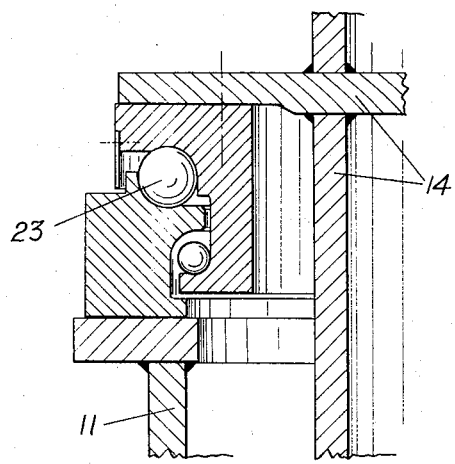
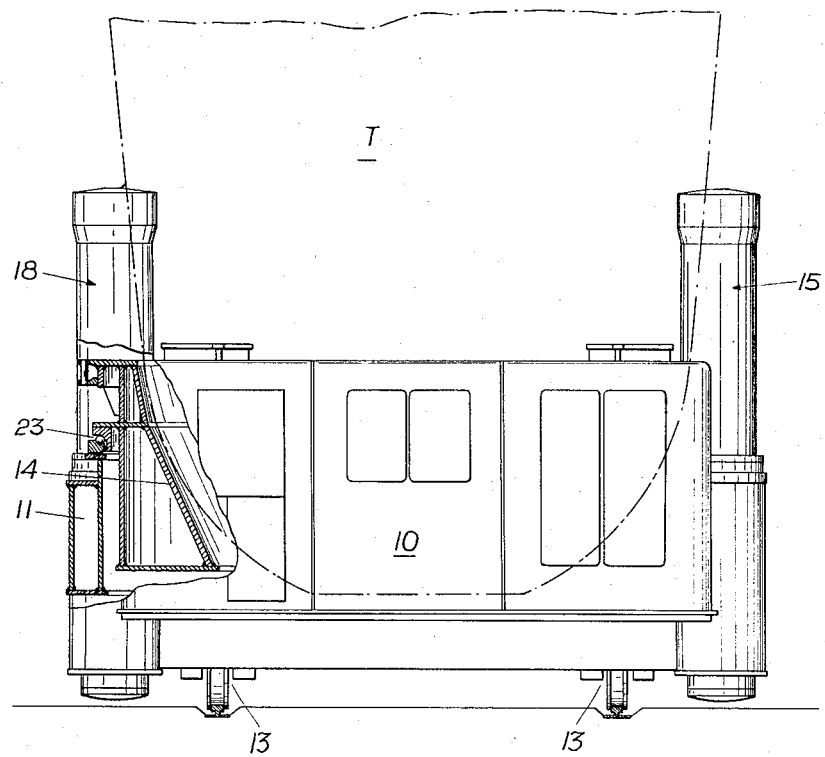
INVENTORS:
PAUL METZ
PETER PUXKANDL
BY
THEIR ATTORNEYS

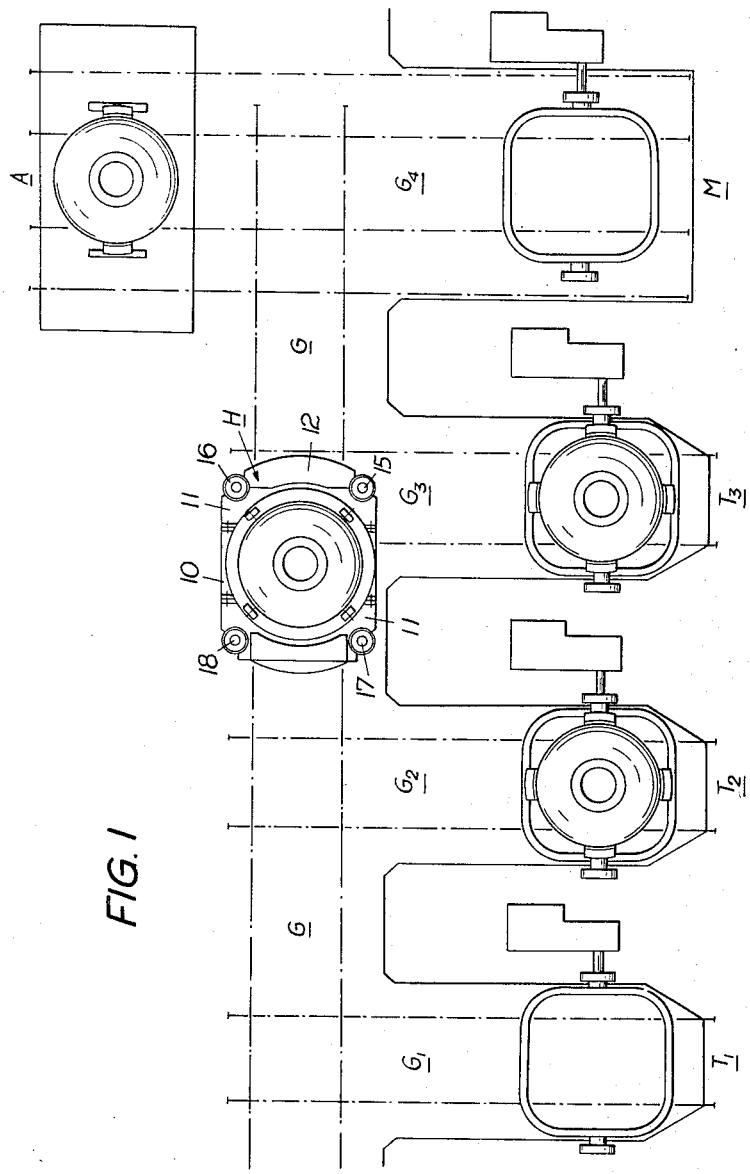

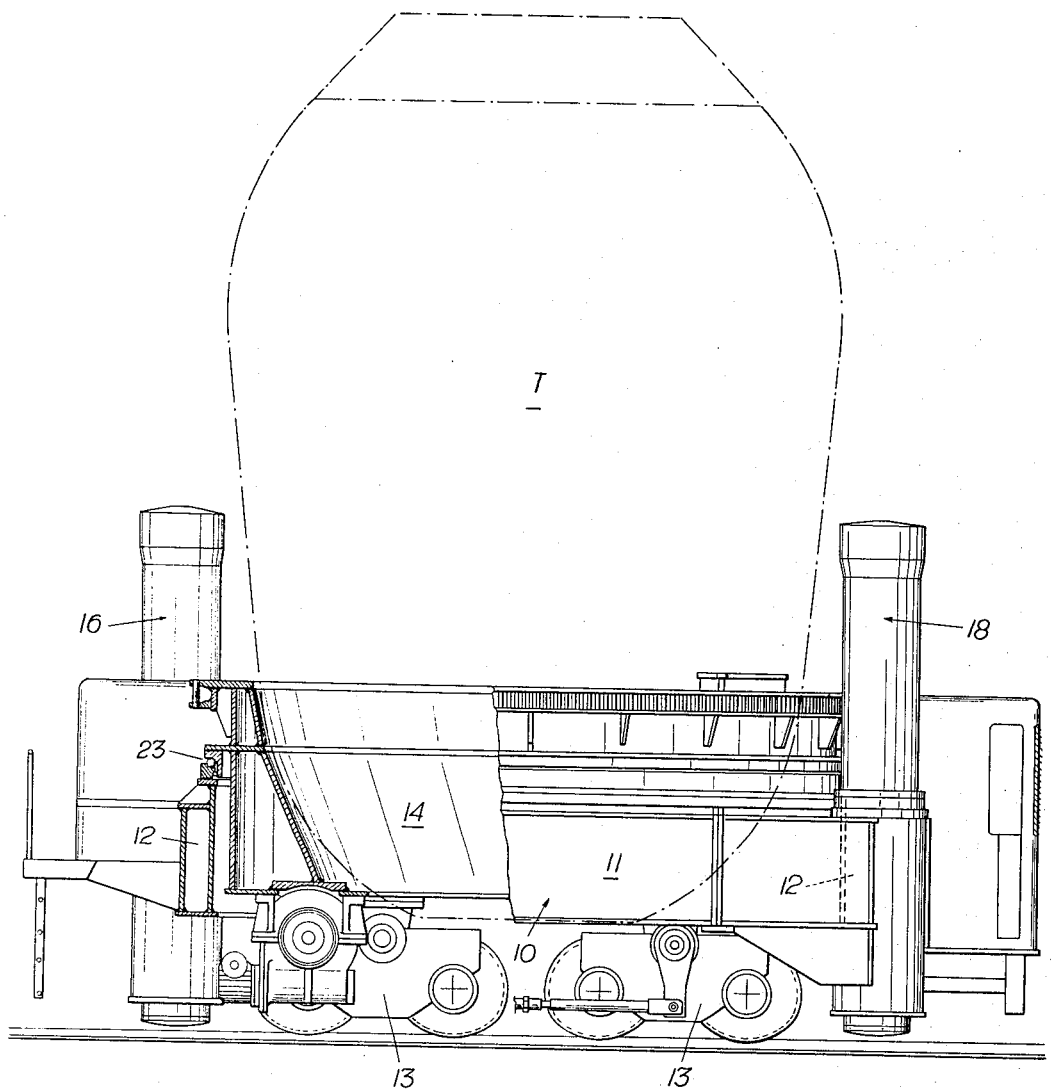

INVENTORS:
PAUL METZ
PETER PUXKANDL
BY

THEIR ATTORNEYS

Jan. 9, 1968   P. METZ ET AL   3,362,700
TRANSPORTING AND LIFTING CAR FOR REFINING VESSELS
Filed Sept. 23, 1964   5 Sheets-Sheet 5

INVENTORS:
PAUL METZ
PETER PUXKANDL
BY
THEIR ATTORNEYS

United States Patent Office 3,362,700
Patented Jan. 9, 1968

3,362,700
TRANSPORTING AND LIFTING CAR FOR
REFINING VESSELS
Paul Metz, Dudelingen, Luxembourg, and Peter Puxkandl,
Linz, Austria, assignors to Vereinigte Osterreichische
Eisen- und Stahlwerke Aktiengesellschaft, Linz, Austria,
a company of Austria
Filed Sept. 23, 1964, Ser. No. 398,693
Claims priority, application Austria, Sept. 27, 1963,
7,786/63
3 Claims. (Cl. 266—35)

ABSTRACT OF THE DISCLOSURE

The invention relates to a car for transporting a crucible or a converter along a track system having intersecting tracks in which the chassis of the car includes a support for the converter or crucible and carries a rotatable frame having lifting jacks on it which can be actuated to lift the frame and the chassis off of one track and allow the chassis to be turned and then lowered onto an intersecting track.

Figure 4A:
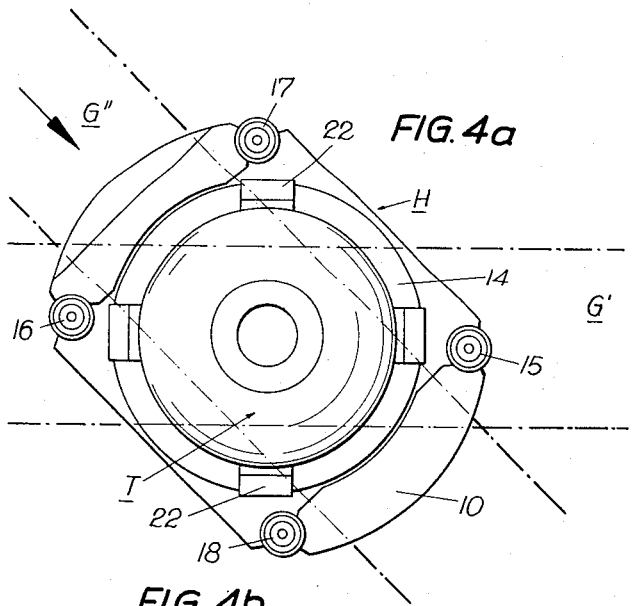

The invention relates to a transporting and lifting car for refining vessels, particularly top-blowing crucibles, having a device for the lifting and lowering of a refining vessel.

Known transporting cars of this kind, which run on rails, consist of a carrier ring installation and a chassis, the carrier ring installation being liftable and lowerable relative to the chassis by means of hydraulic thrustors. Such lifting cars can be used to take crucibles, the lining of which has to be renewed from time to time, out from the blowing stand and along to the re-lining stand; during the period of overhaul, a newly lined crucible is moved to the blowing stand with the aid of the transporting and lifting car, so that re-lining operations do not cause any or, respectively, any important delay in steel production. The liftability and lowerability of the carrier ring installation relative to the chassis has the advantage of allowing the transport to be effected in the lowered position, thus shifting the center of gravity of the load downwards and decreasing the risk of crashes; in known installations there is, however, the disadvantage that a change of direction of the transporting car can only be effected by means of a turntable. If, as is the case in practical steel mill operation, the crucibles are arranged in a row one beside the other and adjacent to them a re-lining stand and possibly a reserve stand and the transporting car is to serve all of these stands, a number of crossings corresponding to the number of crucible and other stands has to be provided. The provision of each crossing with a turntable would complicate the installation and make it so expensive that a re-lining of the crucible on site and its withdrawal from operation during the period of overhaul would seem preferable.

The present invention intends to avoid the described disadvantages and difficulties. It intends in particular the provision of a transporting and lifting car for refining vessels, particularly top-blowing crucibles, which should not only be able to lift and lower the crucible and to transport it in the lowered position, but also to turn it and to effect any desired changes of direction on crossing points without a turntable being needed.

The object of the invention is achieved by providing a frame supportable on the ground by means of pressure devices (thrustors) and adapted to be lifted and lowered in this supported position, in which frame the chassis with the carrier installation destined to hold the refining vessel is horizontally turnable.

The pressure devices may be mechanical spindles. Advantageously, however, they are designed as hydraulically extensible rams.

Chassis and carrier installation are rigidly connected and form a construction unit. For reasons of compact construction it is suitable to arrange in this part the drive motor for the horizontal rotation movement relative to the surrounding frame, as well as the container for the pressure medium and the pump for the hydraulic pressure devices.

The chassis may also advantageously be fitted with a trough to take up the bottom of the crucible, the depth of the trough being chosen such that the center of gravity of the crucible to be transported comes to be as low as possible.

In the drawings the invention is explained in more detail by way of an embodiment. FIG. 1 is a diagrammatic showing of a plant comprising three crucible blowing stands, a lining renewal stand and a reserve or parking stand, FIG. 2 is a front view and FIG. 3 a side view (both diagrams) of a transporting and lifting car and in FIG. 4 the operation of the transporting and lifting car is illustrated in six successive phases, a, b, c, d, e, f, including the change of direction on a crossing point.

In FIG. 1, $T_1$, $T_2$, $T_3$ designate three crucible stands arranged in a row one beside the other. M is a re-lining stand and A a reserve stand. In front of the three crucible stands and the re-lining stand a rail track installation G is provided which is crossed by the tracks $G_1$, $G_2$, $G_3$ and $G_4$ running to the respective crucible stands, as well as to the re-lining stand and the reserve stand. H denotes the transporting and lifting car, which in the position represented runs on the rail track G and is destined to serve all stands. The lifting car consists of the frame 10, which may be made of several parts of longitudinal girders 11 and front girders 12, the chassis 13 and the carrier installation 14 connected therewith. Chassis and carrier installation are horizontally turnable relative to the frame 10, e.g. by means of roller bearings 23. Frame 10 can be supported on the floor by means of hydraulically extensible thrustors 15, 16, 17, 18 and is liftable and lowerable in the supported position.

The function of the transporting and lifting car is illustrated in FIG. 4. In FIG. 4a, G' and G" denote two tracks crossing each other at an angle of 45°. This angle may, however, be chosen at random. The transporting and lifting car with crucible T comes along track G' and is to be moved in the direction of track G". For this purpose the transporting and lifting car is moved onto the crossing points. Then the hydraulic rams are extended in accordance with FIG. 4b, supported on the floor, and by further lifting with the aid of the hydraulic pressure medium the frame, the carrier installation and the crucible are lifted up so far that the chassis loses contact with the rails of track G". In this lifted position the chassis with the carrier installation and the crucible are turned around the crossing angle in accordance with FIG. 4c. According to FIG. 4d, chassis, carrier installation and crucible are lowered until contact with the rails is established, whereupon the hydraulic rams are retracted. According to FIG. 4e the frame is then also turned around the crossing angle. FIG. 4f shows the transporting and lifting car in its new direction at the end of the shifting operation.

Figure 4B:
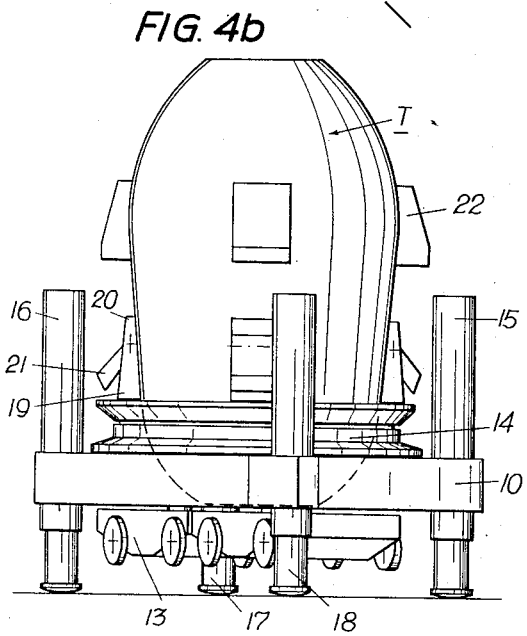
Figure 4C:
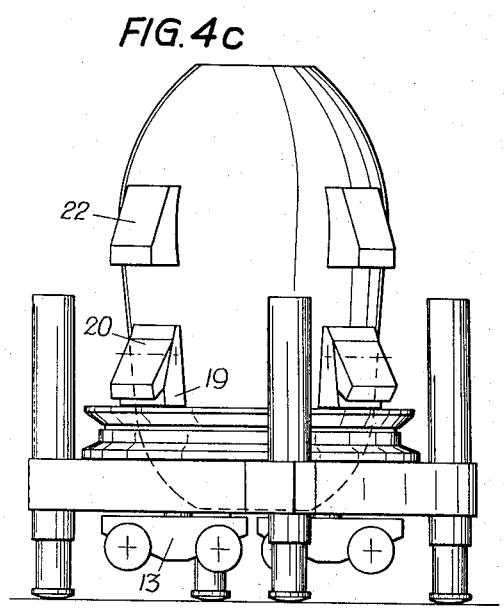
Figure 4D:
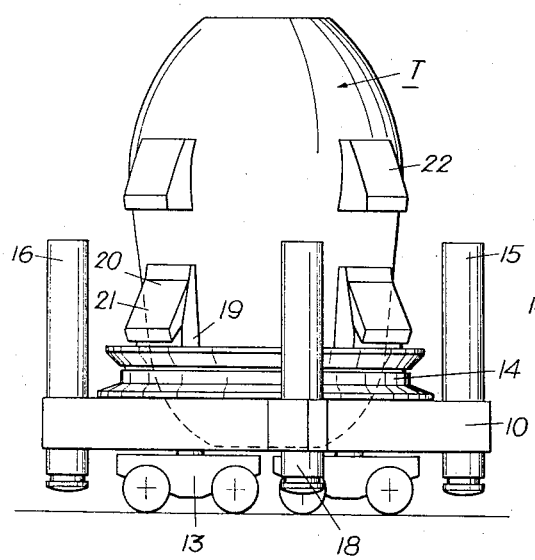
Figure 4E:
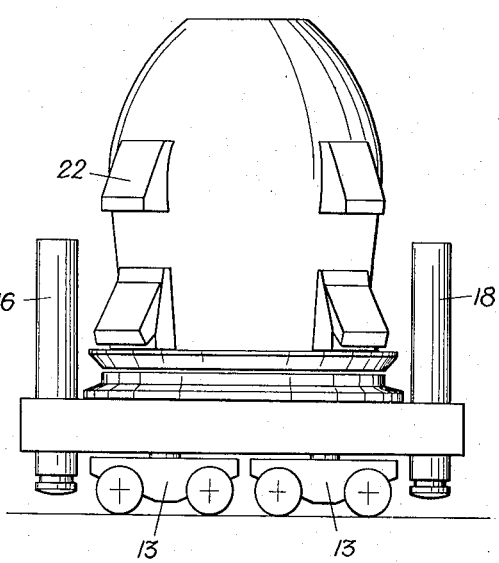
Figure 4F:
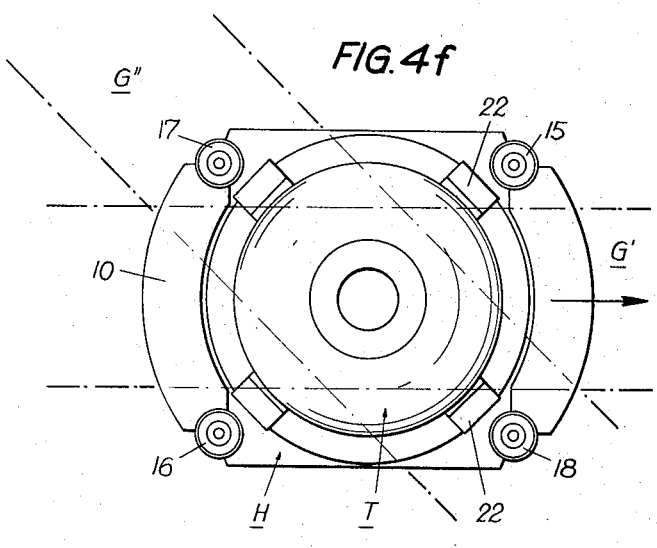

FIG. 4b illustrates further details of the transporting and lifting car: Numeral 19 designates auxiliary noses spaced around the periphery of the lower part of the crucible and resting against the face area of the carrier installation 14. As is evident, the auxiliary noses can be a part of the lower brackets 20 of the crucible. In such case the lower brackets 20 are designed as so-called flap brackets which have a hinged part 21. The series of upper brackets is designated by 22.

What we claim is:

1. A carrier for lifting and transporting refining vessels comprising a chassis, track-engageable wheels on said chassis supporting said chassis for movement, means on said chassis for receiving and supporting a refining vessel, a frame extending outwardly from said chassis, means connecting said frame to said chassis for rotation about a substantially vertical axis and restraining said frame and chassis against substantial relative vertical movement, and jack means on said frame disposed outwardly of said chassis and extendable to lift said frame and said chassis and enable rotation of said chassis relative to said frame.

2. The carrier set forth in claim 1 in which said jack means are a plurality of hydraulic jacks.

3. The carrier set forth in claim 1 in which said means for connecting said frame to said chassis comprises anti-friction bearings including bearing races on said frame and said chassis.

References Cited

UNITED STATES PATENTS

| | | | |
|---|---|---|---|
| 1,930,959 | 10/1933 | Potvin et al. | 254—87 |
| 2,481,699 | 9/1949 | Stroman | 266—36 X |
| 3,239,206 | 3/1966 | Puxbandl | 266—36 |

J. SPENCER OVERHOLSER, *Primary Examiner.*

E. MAR, *Assistant Examiner.*